US011942246B2

(12) United States Patent
Fukuchi et al.

(10) Patent No.: US 11,942,246 B2

(45) Date of Patent: Mar. 26, 2024

(54) NON-ORIENTED ELECTRICAL STEEL SHEET

(71) Applicant: NIPPON STEEL CORPORATION, Tokyo (JP)

(72) Inventors: Minako Fukuchi, Tokyo (JP); Yoshiaki Natori, Tokyo (JP); Tesshu Murakawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/274,385

(22) PCT Filed: Mar. 31, 2022

(86) PCT No.: PCT/JP2022/016385

§ 371 (c)(1),
(2) Date: Jul. 26, 2023

(87) PCT Pub. No.: WO2022/210998

PCT Pub. Date: Oct. 6, 2022

(65) Prior Publication Data

US 2024/0047106 A1 Feb. 8, 2024

(30) Foreign Application Priority Data

Apr. 2, 2021 (JP) ................................ 2021-063551

(51) Int. Cl.

| | |
|---|---|
| ***C21D 9/46*** | (2006.01) |
| ***C21D 1/74*** | (2006.01) |
| ***C21D 6/00*** | (2006.01) |
| ***C21D 8/12*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/08*** | (2006.01) |
| ***C22C 38/10*** | (2006.01) |
| ***C22C 38/14*** | (2006.01) |
| ***C22C 38/16*** | (2006.01) |
| ***C22C 38/60*** | (2006.01) |
| ***H01F 1/147*** | (2006.01) |

(52) U.S. Cl.

CPC .......... *H01F 1/14775* (2013.01); *C21D 1/74* (2013.01); *C21D 6/001* (2013.01); *C21D 6/005* (2013.01); *C21D 6/007* (2013.01); *C21D 6/008* (2013.01); *C21D 8/1222* (2013.01); *C21D 8/1233* (2013.01); *C21D 8/1261* (2013.01); *C21D 8/1277* (2013.01); *C21D 9/46* (2013.01); *C22C 38/001* (2013.01); *C22C 38/002* (2013.01); *C22C 38/004* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/14* (2013.01); *C22C 38/16* (2013.01); *C22C 38/60* (2013.01); *C22C 2202/02* (2013.01)

(58) Field of Classification Search

CPC ........................................................ C21D 9/46

See application file for complete search history.

(56) References Cited

U.S. PATENT DOCUMENTS

2023/0106818 A1 4/2023 Fukuchi et al.

FOREIGN PATENT DOCUMENTS

| | | | |
|---|---|---|---|
| JP | 2006-219692 | A | 8/2006 |
| JP | 4218077 | B2 | 2/2009 |
| JP | 2011-111658 | A | 6/2011 |
| JP | 2011-162821 | A | 8/2011 |
| JP | 5256916 | B2 | 8/2013 |
| JP | 2017-145462 | A | 8/2017 |
| JP | 2017-193731 | A | 10/2017 |
| JP | 2019-178380 | A | 10/2019 |
| JP | 2019-183185 | A | 10/2019 |
| JP | 2020-76138 | A | 5/2020 |
| WO | WO 2013/080891 | A1 | 6/2013 |
| WO | WO 2021/205880 | A1 | 10/2021 |

*Primary Examiner* — Jophy S. Koshy

(74) *Attorney, Agent, or Firm* — Birch, Stewart, Kolasch & Birch, LLP

(57) ABSTRACT

A non-oriented electrical steel sheet of the present invention has a chemical composition capable of causing α-γ transformation, and contains 0.0005% to 0.0050% of Ti, in which, in a case where an area ratio of grains having a crystal orientation of an {hkl}<uvw> orientation (within a tolerance of 10°) when measured by EBSD is denoted as Ahkl-uvw, A411-011 is 15.0% or more, and the non-oriented electrical steel sheet has an average grain size of 10.0 μm to 40.0 μm.

2 Claims, No Drawings

NON-ORIENTED ELECTRICAL STEEL SHEET

TECHNICAL FIELD OF THE INVENTION

The present invention relates to a non-oriented electrical steel sheet.

Priority is claimed on Japanese Patent Application No. 2021-063551, filed Apr. 2, 2021, the content of which is incorporated herein by reference.

BACKGROUND ART

An electrical steel sheet is used as a material of a core of an electric device. Examples of the electric device include a drive motor mounted in a vehicle, a motor for various compressors represented by an air conditioner or a refrigerator, and a power generator for household or industrial use. These electric devices are required to have high energy efficiency, small size, and high output. Therefore, the electrical steel sheet used as a core of the electric device is required to have low iron loss and high magnetic flux density. As a solution to obtain low iron loss and high magnetic flux density, texture control is used, and so far, a technique for developing a structure (α-fiber) that has a magnetization easy axis in a sheet surface of a steel sheet, is advantageous for improving magnetic properties, and can relatively easily enhance development by rolling in hot rolling and cold rolling, which are essential steps of manufacturing of the steel sheet, has been proposed. Specifically, a technique for developing a structure in which a <110> direction is substantially parallel to a rolling direction (RD) has been proposed.

Patent Documents 1 to 3 all disclose a method for developing a {100}<01> orientation, and describe that a structure is refined by lowering a transformation temperature and performing rapid cooling after hot rolling.

Specifically, Patent Document 1 describes that cooling to 250° C. or lower at a cooling rate of 200° C./sec or faster within 3 seconds after hot rolling is performed, annealing is not performed between the hot rolling and cold rolling, and a cumulative rolling reduction in the cold rolling is set to 88% or more. Patent Document 1 describes that accordingly, an electrical steel sheet in which a {100}<011> orientation is developed on a sheet surface of the steel sheet can be manufactured.

In addition, Patent Document 2 discloses a method for manufacturing an electrical steel sheet containing 0.6 mass % or more and 3.0 mass % or less of Al, and describes that the electrical steel sheet in which a {100}<011> orientation is developed on a sheet surface of the steel sheet by the same steps as those in the method described in Patent Document 1.

On the other hand, Patent Document 3 describes that a finish rolling temperature in hot rolling is set to an Ac3 transformation point or higher and cooling to a steel sheet temperature of 250° C. is performed within 3 seconds after the hot rolling, or a finish rolling temperature is set to an Ac3 transformation point −50° C. or lower and cooling is performed at a cooling rate equal to or faster than that of air cooling. Furthermore, in the manufacturing method described in Patent Document 3, cold rolling is performed in two stages with process annealing interposed therebetween, annealing is not performed between the hot rolling and the first stage of the cold rolling, and a cumulative rolling reduction in the second stage of the cold rolling is set to 5% to 15%. Patent Document 3 describes that accordingly, an electrical steel sheet in which a {100}<011> orientation is developed on a sheet surface of the steel sheet can be manufactured.

In any of the methods described in Patent Documents 1 to 3, in a case where the finish rolling temperature in the hot rolling is set to the Ac3 point or higher in manufacturing the electrical steel sheet in which the {100}<011> orientation is developed on the sheet surface of the steel sheet, rapid cooling immediately thereafter is required. When the rapid cooling is performed, a cooling load after the hot rolling increases. In consideration of operational stability, it is preferable that a load of a rolling mill that performs the cold rolling is suppressed.

On the other hand, in order to improve magnetic properties, a technique for developing a {411} plane rotated by 20° from a {100} plane has also been proposed. As a method for developing a {411} plane, Patent Documents 4 to 7 all disclose a technique for developing a {411} plane, and describe that a grain size of a hot-rolled sheet is optimized or an α-fiber is strengthened in a texture of the hot-rolled sheet.

Specifically, Patent Document 4 describes that cold rolling is performed on the hot-rolled sheet in which a development degree of a {211} plane is higher than a development degree of a {411} plane, and a cumulative rolling reduction in the cold rolling is set to 80% or more. It is described that accordingly, an electrical steel sheet in which a {411} plane is developed on a sheet surface of the steel sheet can be manufactured.

In addition, Patent Documents 5 and 6 describe that a slab heating temperature is set to 700° C. or higher and 1150° C. or lower, a finish rolling start temperature is set to 650° C. or higher 850° C. or lower, a finish rolling finishing temperature is set to 550° C. or higher and 800° C. or lower, and a cumulative rolling reduction in cold rolling is set to 85% to 95%. It is described that accordingly, an electrical steel sheet in which a {100} plane and a {411} plane are developed on a sheet surface of the steel sheet can be manufactured.

On the other hand, Patent Document 7 describes that when an α-fiber is developed in a steel sheet of a hot-rolled coil to the vicinity of a surface layer of the steel sheet by strip casting or the like, an {h11}<1/h12> orientation, particularly, {100}<012> to {411}<148> orientations are recrystallized by subsequent hot-rolled sheet annealing.

PRIOR ART DOCUMENT

Patent Document

[Patent Document 1] Japanese Unexamined Patent Application, First Publication No. 2017-145462
[Patent Document 2] Japanese Unexamined Patent Application, First Publication No. 2017-193731
[Patent Document 3] Japanese Unexamined Patent Application, First Publication No. 2019-178380
[Patent Document 4] Japanese Patent No. 4218077
[Patent Document 5] Japanese Patent No. 5256916
[Patent Document 6] Japanese Unexamined Patent Application, First Publication No. 2011-111658
[Patent Document 7] Japanese Unexamined Patent Application, First Publication No. 2019-183185

DISCLOSURE OF THE INVENTION

Problems to be Solved by the Invention

The present inventors studied the above-described techniques and found that in order to strengthen a {100}<011> orientation and improve magnetic properties according to Patent Documents 1 to 3, rapid cooling immediately after hot rolling is necessary, and a problem of an increased manufacturing load occurs. Furthermore, it was recognized that in a case where the steel sheet in which the {100}<011> orientation is strengthened is used as a material of an interlocking core, there are cases where core properties expected from the material cannot be obtained. As a result of studying a cause of this, it is considered that the {100}<011> orientation causes a change in magnetic properties against a stress, specifically, an increase in deterioration (stress sensitivity) of magnetic properties in a case where a compressive stress is applied.

In addition, it was determined that although the {411} plane is developed in the techniques according to Patent Documents 4 to 7, development in the <011> plane of an in-plane orientation is weak, and magnetic properties in a 450 direction with respect to a rolling direction of the steel sheet, which are properties of the α-fiber, are not sufficiently improved. It was thought that an in-plane orientation that is not aligned with the <011> plane, that is, a large deviation from the α-fiber is a factor that inhibits the development in the {411} plane as a plane orientation, and may be a cause of an insufficient improvement in the magnetic properties.

In a case where a non-oriented electrical steel sheet is used for a rotor of a motor, not only high magnetic flux density but also high strength is required because of high-speed rotation. In order to achieve both high strength and high magnetic flux density, development of {100} planes, which is advantageous for improving magnetic properties through texture control, has been studied. In the prior art, it is developed through a special process of cold rolling at a high pressure reduction rate of over 95% and vacuum annealing for over ten hours, and cost reduction is required in industrial production.

In view of the above problems, an object of the present invention is to provide a non-oriented electrical steel sheet having a low iron loss, a high magnetic flux density, and a high strength.

Means for Solving the Problem

The present inventors have intensively studied to solve the above-mentioned problems. As a result, it was found that it is effective to optimize a chemical composition, a grain size after hot rolling, and a rolling reduction in cold rolling. Specifically, on the premise of a chemical composition of an α-γ transformation system, by optimizing a grain size by performing cooling under predetermined conditions after hot rolling performed under predetermined conditions, performing cold rolling at a predetermined rolling reduction, controlling a temperature of process annealing within a predetermined range, and performing annealing after performing second cold rolling (skin pass rolling) at an appropriate rolling reduction, it is effective to facilitate the development of grains in a {411}<011> orientation, which is normally difficult to develop. The present inventors have conducted further intensive studies based on such findings, and as a result, have arrived at various aspects of the invention described below.

(1) A non-oriented electrical steel sheet according to an aspect of the present invention includes, as a chemical composition, by mass %:

C: 0.0100% or less;
Si: 1.5% to 4.0%;
sol. Al: 0.0001% to 1.000%;
S: 0.0100% or less;
N: 0.0100% or less;
Ti: 0.0005% to 0.0050%;
one or more selected from the group consisting of Mn, Ni, and Cu: 2.5% to 5.0% in total;
Co: 0.0% to 1.0%;
Sn: 0.00% to 0.40%;
Sb: 0.00% to 0.40%;
P: 0.000% to 0.400%;
one or more selected from the group consisting of Mg, Ca, Sr, Ba, Ce, La, Nd, Pr, Zn, and Cd: 0.000% to 0.010% in total,
in which Expression (1) is satisfied in a case where a Mn content (mass %) is indicated as [Mn], a Ni content (mass %) is indicated as [Ni], a Cu content (mass %) is indicated as [Cu], a Si content (mass %) is indicated as [Si], a sol. Al content (mass %) is indicated as [sol. Al], and a P content (mass %) is indicated as [P]; and
a remainder consisting of Fe and impurities,
in which, in a case where an area ratio of grains having a crystal orientation of an {hkl}<uvw> orientation (within a tolerance of 10°) when measured by EBSD is denoted as Ahkl-uvw, A411-011 is 15.0% or more, and
the non-oriented electrical steel sheet has an average grain size of 10.0 μm to 40.0 μm, $$(2\times[Mn]+2.5\times[Ni]+[Cu])-([Si]+2\times[sol.\ Al]+4\times[P])\geq 1.50\% \quad (1)$$

(2) The non-oriented electrical steel sheet according to (1), in which a magnetic flux density B50 in a 45° direction with respect to a rolling direction may be 1.70 T or more, and an iron loss W10/400 in the 45° direction with respect to the rolling direction may be 14.0 W/kg or less.

Effects of the Invention

According to the above aspect according to the present invention, it is possible to provide a non-oriented electrical steel sheet having a low iron loss, a high magnetic flux density, and a high strength.

EMBODIMENTS OF THE INVENTION

Hereinafter, embodiments of the present invention will be described in detail.

First, chemical compositions of a non-oriented electrical steel sheet according to the embodiment of the present invention, a steel used in a manufacturing method thereof, and a cold-rolled steel sheet used for manufacturing the non-oriented electrical steel sheet will be described. In the following description, "%", which is a unit of the amount of each element contained in the non-oriented electrical steel sheet or the steel, means "mass %" unless otherwise specified. In addition, a numerical range represented by "to" means a range including numerical values described before and after "to" as a lower limit and an upper limit. Numerical values indicated as "less than" or "more than" do not fall within the numerical range.

The non-oriented electrical steel sheet, the cold-rolled steel sheet, and the steel according to the present embodiment have a chemical composition in which ferrite-austenite transformation (hereinafter, α-γ transformation) can occur. Specifically, as the chemical composition, C: 0.0100% or less, Si: 1.5% to 4.0%, sol. Al: 0.0001% to 1.000%, S; 0.0100% or less, N; 0.0100% or less, Ti: 0.0005% to 0.0050%, one or more selected from the group consisting of Mn, Ni, and Cu: 2.5% to 5.0% in total, Co: 0.0% to 1.0%, Sn: 0.00% to 0.40%, Sb: 0.00% to 0.40%, P: 0.000% to 0.400%, one or more selected from the group consisting of Mg, Ca, Sr. Ba, Ce, La, Nd, Pr, Zn, and Cd: 0.000% to 0.010% in total, and a remainder including Fe and impurities are contained. Furthermore, amounts of Mn, Ni, Cu, Si, sol. Al, and P satisfy predetermined conditions described below.

Examples of the impurities include those contained in raw materials such as ore and scrap, those contained in manufacturing steps, and those permitted within a range that does not adversely affect properties of the non-oriented electrical steel sheet according to the present embodiment.

(C: 0.0100% or Less)

C precipitates as fine carbides that inhibit grain growth, thereby increasing an iron loss of the non-oriented electrical steel sheet and causing magnetic aging. Therefore, the lower a C content, the better. Such a phenomenon is significant when the C content is more than 0.0100%. Therefore, the C content is set to 0.0100% or less. The C content is preferably 0.0050% or less, 0.0030% or less, and 0.0020% or less.

A lower limit of the C content is not particularly limited, but may be 0%. However, in an actual non-oriented electrical steel sheet, it may be difficult to set the C content to 0% in terms of refining technology. Therefore, the C content may be set to more than 0%. Considering a cost of a decarburization treatment during refining, the C content is preferably set to 0.0005% or more.

(Si: 1.5% to 4.0%)

Si reduces the iron loss by increasing electric resistance of the non-oriented electrical steel sheet and reducing an eddy-current loss, and improves punching workability into a core by increasing a yield ratio. When the Si content is less than 1.5%, these effects cannot be sufficiently obtained. Therefore, the Si content is set to 1.5% or more. The Si content is preferably 2.0% or more, and 2.4% or more.

On the other hand, when the Si content is more than 4.0%, a magnetic flux density of the non-oriented electrical steel sheet decreases, the punching workability decreases due to an excessive increase in hardness, and cold rolling becomes difficult. Therefore, the Si content is set to 4.0% or less. The Si content is preferably 3.5% or less, and 3.0% or less.

(Sol. Al: 0.0001% to 1.000%)

sol. Al reduces the iron loss by increasing the electric resistance of the non-oriented electrical steel sheet and reducing the eddy-current loss. sol. Al also contributes to an improvement in a relative magnitude of a magnetic flux density B50 with respect to a saturation magnetic flux density. When the sol. Al content is less than 0.0001%, these effects cannot be sufficiently obtained. In addition, sol. Al also has an effect of promoting desulfurization in a steel-making process. Therefore, the sol. Al content is set to 0.0001% or more. The sol. Al content is preferably 0.001% or more, or 0.005% or more.

On the other hand, when the sol. Al content is more than 1.000%, the magnetic flux density of the non-oriented electrical steel sheet decreases, or the yield ratio decreases, so that the punching workability decreases. Therefore, the sol. Al content is set to 1.000% or less. The sol. Al content is preferably 0.800% or less, 0.500% or less, and 0.200% or less.

In addition, when the sol. Al content is in a range of 0.010% to 0.100%, AlN precipitates and inhibits grain growth, resulting in a large iron loss deterioration range. Therefore, it is preferable to avoid this content range.

In the present embodiment, sol. Al means acid-soluble Al, and indicates solute Al present in the steel in a solid solution state.

(S: 0.0100% or Less)

S is an element that may be contained in steel without intentional inclusion. S precipitates as fine MnS and thus inhibits recrystallization in process annealing and grain growth in final annealing. Therefore, the lower a S content, the better. An increase in the iron loss and a decrease in the magnetic flux density of the non-oriented electrical steel sheet caused by such inhibition of the recrystallization and the grain growth are significant when the S content is more than 0.0100%. Therefore, the S content is set to 0.0100% or less. The S content is preferably 0.0050% or less, and 0.0020% or less.

A lower limit of the S content is not particularly limited, but may be 0%. However, considering a cost of a desulfurization treatment during refining, the S content is preferably set to 0.0003% or more. The S content is more preferably 0.0005% or more.

(N: 0.0100% or Less)

N deteriorates magnetic properties of the non-oriented electrical steel sheet through formation of fine precipitates such as TiN and AlN, so that the lower a N content, the better. In a case where the N content is more than 0.0100%, the deterioration of the magnetic properties of the non-oriented electrical steel sheet is significant. Therefore, the N content is set to 0.0100% or less. The N content is preferably 0.0050% or less, and 0.0030% or less.

A lower limit of the N content is not particularly limited, but may be 0%. However, considering a cost of a denitration treatment during refining, the N content is preferably set to 0.0005% or more, and more preferably set to 0.0010% or more.

(Ti: 0.0005% to 0.0050%)

Ti is an element necessary for solid solution strengthening and grain refinement strengthening. When the Ti content is less than 0.0005%, these effects cannot be sufficiently obtained. Therefore, the Ti content is set to 0.0005% or more. The Ti content is preferably 0.0010% or more, and 0.0015% or more.

On the other hand, when the Ti content is more than 0.0050%, a large amount of TiN, which is a fine precipitate, is formed, degrade the magnetic properties of the non-oriented electrical steel sheet. Therefore, the Ti content is set to 0.0050% or less. The Ti content is preferably 0.0030% or less, and 0.0025% or less.

(One or More Selected from Group Consisting of Mn, Ni, and Cu: 2.5% to 5.0% in Total)

Since Mn, Ni, and Cu are elements necessary for causing $\alpha$-$\gamma$ transformation, one or more of these elements need to be contained in a total amount of 2.5% or more. It is not necessary to include all of Mn, Ni, and Cu, and only one of these elements may be contained, and the amount thereof may be 2.5% or more. The total amount of Mn, Ni, and Cu is preferably 2.8% or more, 3.0% or more, and 3.7% or more.

On the other hand, when the total amount of these elements is more than 5.0%, an alloy cost increases, and there are cases where the magnetic flux density of the non-oriented electrical steel sheet decreases. Therefore, the total amount of these elements is set to 5.0% or less. The total amount of these elements is preferably 4.0% or less.

In the present embodiment, the chemical composition of the non-oriented electrical steel sheet further satisfies the following conditions as conditions under which $\alpha$-$\gamma$ transformation can occur. That is. Expression (1) is satisfied by mass % in a case where a Mn content (mass %) is indicated as [Mn], a Ni content (mass %) is indicated as [Ni], a Cu content (mass %) is indicated as [Cu], a Si content (mass %)

is indicated as [Si], a sol. Al content (mass %) is indicated as [sol. Al], and a P content (mass %) is indicated as [P].

$$(2\times[\mathrm{Mn}]+2.5\times[\mathrm{Ni}]+[\mathrm{Cu}])-([\mathrm{Si}]+2\times[\mathrm{sol.\ Al}]+4\times[\mathrm{P}])\geq 1.50\% \quad (1)$$

In a case where Expression (1) is not satisfied. α-γ transformation does not occur, so that the magnetic flux density of the non-oriented electrical steel sheet decreases. A left side of Expression (1) is preferably 2.00% or more, 3.00% or more, and 3.40% or more.

An upper limit of the left side of Expression (1) is not particularly limited, but may be set to 10.00% or less, 6.00% or less, or 5.00% or less.

(Co: 0.0% to 1.0%)

Since Co is an element effective for causing α-γ transformation, Co may be contained as necessary. However, when Co is excessively contained, the alloy cost increases and there are cases where the magnetic flux density of the non-oriented electrical steel sheet decreases. Therefore, a Co content is set to 1.0% or less. The Co content is preferably 0.5% or less.

The Co content may be 0.0%. However, in order to stably cause α-γ transformation, the Co content is preferably set to 0.01% or more, and more preferably set to 0.1% or more.

(Sn: 0.00% to 0.40%, Sb: 0.00% to 0.40%)

Sn and Sb improve a texture after cold rolling and recrystallization and thus improve the magnetic flux density of the non-oriented electrical steel sheet. Therefore, these elements may be contained as necessary. However, excessive inclusion of these elements causes embrittlement of steel. Therefore, both a Sn content and a Sb content are set to 0.40% or less. Preferably, both the Sn content and the Sb content are 0.20% or less.

Both the Sn content and the Sb content may also be 0.0%. However, in a case of imparting an effect of improving the magnetic flux density of the non-oriented electrical steel sheet as described above, the Sn content or the Sb content is preferably set to 0.02% or mom.

(P: 0.000% to 0.400%)

P may be contained in order to secure hardness of the non-oriented electrical steel sheet after grain growth (after final annealing), but excessive inclusion of P causes embrittlement of steel. Therefore, the P content is set to 0.400% or less. The P content is preferably 0.100% or less, and 0.050% or less.

A lower limit of the P content is not particularly limited, but may be 0.000%, 0.005% or more, or 0.010% or more. In a case where a further effect such as an improvement in magnetic properties is to be imparted, the P content is preferably set to 0.020% or more.

(One or More Selected from Group Consisting of Mg, Ca, Sr, Ba, Ce, La, Nd, Pr, Zn, and Cd: 0.000% to 0.010% in Total)

Mg, Ca, Sr, Ba, Ce, La, Nd, Pr, Zn, and Cd react with S in molten steel during casting of the molten steel to form precipitates of sulfides, oxysulfides, or both thereof. Hereinafter, Mg, Ca, Sr, Ba, Ce, La, Nd, Pr. Zn, and Cd may be collectively referred to as "coarse precipitate forming elements". A grain size of precipitates generated by the coarse precipitate forming elements is about 1 μm to 2 μm, which is much larger than a grain size of fine precipitates such as MnS, TiN, and AlN (about 100 nm). Therefore, these fine precipitates adhere to the precipitates generated by the coarse precipitate forming elements, and it becomes difficult to inhibit recrystallization and grain growth in annealing such as process annealing. As a result, an average grain size of the non-oriented electrical steel sheet can be preferably controlled. Therefore, the coarse precipitate forming elements may be contained as necessary. In order to sufficiently obtain the above-described effects, the total amount of the coarse precipitate forming elements is preferably 0.0005% or more. The total amount of the coarse precipitate forming elements more preferably 0.001% or more, and 0.004% or more.

However, when the total amount of the coarse precipitate forming elements is more than 0.010%, the total amount of sulfides, oxysulfides, or both thereof becomes excessive, and recrystallization and grain growth in annealing such as process annealing are inhibited. Therefore, the total amount of the coarse precipitate forming elements is set to 0.010% or less. The total amount of the coarse precipitate forming elements is preferably 0.007% or less.

Next, a method for measuring an area ratio of grains (specific oriented grains) having a specific orientation of the non-oriented electrical steel sheet according to the present embodiment will be described. The area ratio of the specific oriented grains is measured by an electron back scattering diffraction pattern (EBSD) method that adopts the following measurement conditions using OMI Analysis 7.3 (manufactured by TSL). As a measuring device, for example, an EBSD detector and a scanning electron microscope (SEM) are used. First, target specific oriented grains are extracted from a measurement region (a tolerance is set to 10°, and hereinafter, described as within a tolerance of 10°). An area of the extracted specific oriented grains is divided by an area of the measurement region to obtain a percentage. This percentage is defined as the area ratio of the specific oriented grains.

Hereinafter, there are cases where "an area ratio of grains having a crystal orientation in an {hkl}<uvw> orientation (within a tolerance of 10°) to a measurement region" and "an area ratio of grains having a crystal orientation in an {hkl} plane (within a tolerance of 10°) to a measurement region" are simply referred to as an "{hkl}<uvw> ratio" and an "{hkl} ratio", respectively. Hereinafter, in the description of the crystal orientation, it is assumed that the tolerance is within 10°.

In the non-oriented electrical steel sheet according to the present embodiment, in a case where the area ratio of the grains having a crystal orientation in the {hkl}<uvw> orientation when measured by EBSD within a tolerance of 10° is denoted as Ahkl-uvw, A411-011 is set to 15.0% or more. When A411-011 ({411}<011> ratio) is less than 15.0%, excellent magnetic properties cannot be obtained in the non-oriented electrical steel sheet. Therefore, the {411}<011> ratio is set to 15.0% or more. The {411}<011> ratio is preferably 20.0% or more, and more preferably 25.0% or more.

An upper limit thereof is not particularly limited, but the {411}<011> ratio may be set to 50.0% or less, 40.0% or less, or 30.0% or less.

Details of the measurement conditions for obtaining the area ratio of the specific oriented grains are as follows.

Measuring device: SEM model number "JSM-6400 (manufactured by JEOL Ltd.)" and EBSD detector model number "HIKARI (manufactured by TSL)" are used Step interval: 0.3 μm (after process annealing and after skin pass rolling) or 5.0 μm (after final annealing)

Magnification: 1,000-fold (after process annealing, after skin pass rolling) or 100-fold (after final annealing)

Measurement target: Center layer (thickness ½ portion) of a Z surface (a sheet surface perpendicular to a sheet thickness direction) at the center of a C direction of the steel sheet In addition, the thickness ½ portion may be exposed by reducing the thickness by polishing.

Measurement region: Region of 1000 μm or more in an L direction and 1000 μm or more in the C direction In addition, in the measurement by EBSD, the non-oriented electrical steel sheet according to the present embodiment preferably has a maximum intensity at φ1=0° to 10° among φ1=0° to 90° and Φ=20° and a maximum intensity at Φ=5° to 35° among φ1=0° and Φ=0° to 90°. Having a maximum intensity at φ1=0° to 10° among φ1=0° to 90° and Φ=20° is synonymous with having a maximum intensity near a {411}<011> orientation among {411}<uvw> orientations. That is, having a maximum intensity at φ1=0° to 10° among φ1=0° to 90° and Φ=20° is synonymous with that the area ratio of grains having a crystal orientation in the {411}<011> orientation is high. The {411}<011> orientation is superior to a {411}<148> orientation and the like in magnetic properties in a 450 direction. When the maximum intensity is present at φ1=20° to 30° among φ1=0° to 90° and Φ=20°, the maximum intensity is present near the {411}<148> orientation, which is not preferable. That is, an area ratio of grains having a crystal orientation in the {411}<148> orientation is high, and the area ratio of the grains having a crystal orientation in the {411}<011> orientation is low, which is not preferable.

It is more preferable that the maximum intensity is present at φ1=0° to 5° among φ1=0° to 90° and Φ=20°.

On the other hand, having a maximum intensity at Φ=5° to 35° among φ1=0° and Φ=0° to 90° when measured by EBSD is synonymous with having a maximum intensity near the {411}<011> orientation among {hkl}<011> orientations. That is, having a maximum intensity at Φ=5° to 35° among φ1=0° and Φ=0° to 90° is synonymous with that the area ratio of grains having a crystal orientation in the {411}<011> orientation is high. Since the {411}<011> orientation has excellent magnetic properties and has a lower stress sensitivity than that of the {100}<011> orientation, there is little deterioration in the magnetic properties in the interlocking core or the like. When the maximum intensity is present at Φ=0° to 3° among φ1=0° and Φ=0° to 90°, the maximum intensity is present near the {100}<011> orientation, which is not preferable. That is, the area ratio of the grains having the crystal orientation in the {100}<011> orientation is high, and the area ratio of the grains having the crystal orientation in the {411}<011> orientation is low, which is not preferable.

It is more preferable that the maximum intensity is present at Φ=20° to 30° among φ1=0° and Φ=0° to 90°.

Here, a method for determining a maximum intensity in a specific orientation range of the non-oriented electrical steel sheet will be described. An orientation distribution function (ODF) is created under the following conditions using OMI Analysis 7.3 in the measurement region by EBSD. Then, data of the created ODF is output, and a point where the ODF value becomes maximum in a specific orientation range (the range is specified by angles of φ1 and Φ) is set as the maximum intensity.

In addition, a method for determining an ODF intensity in a specific orientation in the non-oriented electrical steel sheet will be described. An ODF is created under the following conditions using OMI Analysis 7.3 in the measurement region by EBSD. Then, data of the created ODF is output, and an ODF value in a specific orientation (the orientation is specified by angles of φ1 and Φ) is set as the ODF intensity.

Details of the conditions for creating the ODF are as follows.

Series Rank [L]: 16

Gaussian Half-Width [degrees]: 5

Simple Symmetry: Triclinic (None)

Bunge Euler Angles: φ1=0° to 90°, φ2=45°, Φ=0° to 90°

Furthermore, in the present embodiment, an area ratio of grains having a specific orientation (within a tolerance of 10°) when measured by EBSD can be denoted as follows. In a case where an area ratio of grains having a crystal orientation in an {hkl}<uvw> orientation (within a tolerance of 10°) is denoted as Ahkl-uvw, and an area ratio of grains having a crystal orientation in an {hkl} plane (within a tolerance of 10°) is denoted as Ahkl, it is preferable that both Expressions (2) and (3) are satisfied.

$$A411-011/A411-148 \geq 1.1 \quad (2)$$

$$A411-011/A100-011 \geq 2 \quad (3)$$

In addition, the magnetic properties are superior when there is a large number of grains having a crystal orientation in a {411} plane, but are inferior when there is a large number of grains having a crystal orientation in a {11} plane. Therefore, it is preferable that a {411} ratio is more than a {111} ratio, that is, the {411} ratio/the {111} ratio >1. More preferably, the {411} ratio is twice or more the {111} ratio, that is, the {411} ratio/the {111} ratio ≥2.

Next, the average grain size of the non-oriented electrical steel sheet according to the present embodiment of the present invention will be described. When the grains are not sufficiently coarsened and the average grain size becomes smaller than 10.0 μm, the iron loss of the non-oriented electrical steel sheet deteriorates. Therefore, the average grain size of the non-oriented electrical steel sheet is set to 10.0 μm or more. The average grain size of the non-oriented electrical steel sheet is preferably 20.0 μm or more.

On the other hand, when the grains are coarsened and the average grain size becomes larger than 40.0 μm, a strength of the non-oriented electrical steel sheet is insufficient, and not only does workability further deteriorate but also the eddy-current loss deteriorates. Therefore, the average grain size of the non-oriented electrical steel sheet is set to 40.0 μm or less. The average grain size of the non-oriented electrical steel sheet is preferably 37.0 μm or less or 35.0 μm or less.

In the present embodiment, the average grain size is measured by an intercept method.

Next, a sheet thickness of the non-oriented electrical steel sheet according to the present embodiment will be described. The sheet thickness of the non-oriented electrical steel sheet according to the present embodiment is not particularly limited. A preferable sheet thickness of the non-oriented electrical steel sheet according to the present embodiment is 0.25 to 0.5 mm. Generally, as the sheet thickness decreases, the iron loss decreases, but the magnetic flux density decreases. Considering this point, when the sheet thickness is 0.25 mm or more, the iron loss further decreases, and the magnetic flux density further increases. In addition, when the sheet thickness is 0.5 mm or less, a low iron loss can be maintained. A more preferable lower limit of the sheet thickness is 0.3 mm.

It is preferable that the non-oriented electrical steel sheet according to the present embodiment has a magnetic flux density B50 in the 45° direction with respect to a rolling direction of 1.70 T or more, and an iron loss W10/400 in the 450 direction with respect to the rolling direction of 14.0 W/kg or less. The magnetic flux density B50 in the 45° direction with respect to the rolling direction is more preferably 1.72 T or more. An upper limit thereof is not particularly limited, but may be set to 1.85 T or less or 1.80 T or less. In addition, an all-directional average magnetic flux density B50 is preferably 1.55 T or more, and more preferably 1.60 T or more.

The iron loss W10/400 in the 450 direction with respect to the rolling direction is more preferably 13.5 W/kg or less, 13.0 W/kg or less, or 12.5 W/kg or less. A lower limit thereof is not particularly limited, but may be 11.0 W/kg or more or 11.5 W/kg or more.

An iron loss deterioration percentage $W_x$ [%] of an iron loss W10/50 under a compressive stress is preferably 40.0% or less, more preferably 32.0% or less, and even more preferably 30.0% or less.

Furthermore, regarding the strength, the non-oriented electrical steel sheet according to the present embodiment preferably has a tensile strength of 600 MPa or more. The tensile strength is more preferably set to 620 MPa or more or 650 MPa or more. An upper limit thereof is not particularly limited, but may be set to 800 MPa or less or 750 MPa or less.

Here, the magnetic flux density B50 is a magnetic flux density in a magnetic field of 5,000 A/m.

In addition, the rolling direction of the non-oriented electrical steel sheet indicates a coil longitudinal direction. As a method for determining the rolling direction in a small piece sample or the like, for example, there is a method in which a direction parallel to a roll stripe pattern on a surface of a non-oriented electrical steel sheet is regarded as a rolling direction.

The magnetic flux density B50 is obtained by cutting out a 55 mm square sample from the non-oriented electrical steel sheet in 450 and 0° directions and the like with respect to the rolling direction, and measuring a magnetic flux density in a magnetic field of 5,000 A/m using a single sheet magnetic property measuring device. The magnetic flux density B50 in the 45° direction with respect to the rolling direction is obtained by calculating an average value of magnetic flux densities in the 45° direction and a 1350 direction with respect to the rolling direction. The magnetic flux density B50 on all-directional average (omnidirectional average) is obtained by calculating an average value of magnetic flux densities at 0°, 45°, 90°, and 135° with respect to the rolling direction.

The iron loss W10/400 is obtained by measuring an all-directional average energy loss (W/kg) that occurs when an AC magnetic field of 400 Hz is applied to a sample collected from the non-oriented electrical steel sheet to achieve a maximum magnetic flux density of 1.0 T using the single sheet magnetic property measuring device.

Regarding the iron loss deterioration percentage $W_x$ [%] of the iron loss W10/50 under a compressive stress, in a case where an iron loss W10/50 with no stress is indicated as W10/50(0) and an iron loss W10/50 under a compressive stress of 10 MPa is indicated as W10/50(10), the iron loss deterioration percentage $W_x$ can be calculated by the following expression. The iron loss W10/50 is obtained by measuring an all-directional average energy loss (W/kg) that occurs when an AC magnetic field of 50 Hz is applied to achieve a maximum magnetic flux density of 1.0 T using a sample collected in the 450 direction with respect to the rolling direction and the single sheet magnetic property measuring device.

$$W_x=\{W10/50(10)-W10/50(0)\}/W10/50(0)$$

The tensile strength of the non-oriented electrical steel sheet is obtained by collecting a JIS No. 5 test piece whose longitudinal direction is the rolling direction of the non-oriented electrical steel sheet and conducting a tensile test according to JIS Z 2241:2011.

The properties of the non-oriented electrical steel sheet according to the present embodiment described above are properties of a non-oriented electrical steel sheet manufactured by performing final annealing. Hereinafter, the properties of the non-oriented electrical steel sheet before performing the final annealing (and after performing skin pass rolling) will be described.

The non-oriented electrical steel sheet after skin pass rolling (before final annealing) has a number average value Gs of grain orientation spread (GOS) values described below. Here, the GOS value is an average of misorientation between all measurement points (pixels) within the same grain, and the GOS value is higher in crystal grains with much strains. After the skin pass rolling, in a case where the number average value Gs of the GOS values is small, that is, in a low strain state, grain growth due to bulging is likely to occur in the final annealing in the next step. Therefore, the number average value Gs of the GOS values after the skin pass rolling is preferably set to 3.0 or less.

On the other hand, when the number average value Gs of the GOS values is less than 0.8, a strain amount becomes too small, and a final annealing time required for grain growth due to bulging increases. Therefore, it is preferable to set the number average value Gs of the GOS values after the skin pass rolling to 0.8 or more.

Here, a method for calculating Gs in a steel sheet will be described. By analyzing with the EBSD data at the time of measuring the area ratio of the grains with the above specific orientation and OIM Analysis 7.3, the number average value of the GOS values is obtained and defined as Gs.

In the non-oriented electrical steel sheet after the skin pass rolling (before the final annealing), as an α-fiber ratio increases, the magnetic properties after the final annealing become superior. Here, a method for measuring the α-fiber ratio will be described. In the present embodiment, an α-fiber is defined as grains having a crystal orientation in an {hkl}<011> orientation. In the measurement region by EBSD, grains having a crystal orientation in the {hkl}<011> orientation are extracted (within a tolerance of 10°) using OMI Analysis 7.3. An area of the extracted grains is divided by the area of the measurement region to obtain a percentage. This percentage is defined as the α-fiber ratio.

In the non-oriented electrical steel sheet after the skin pass rolling (before the final annealing), the α-fiber ratio is preferably set to 20% or more. The α-fiber ratio is more preferably 25% or higher.

In addition, in the non-oriented electrical steel sheet after the skin pass rolling (before the final annealing), an ODF intensity in the {100}<011> orientation is set to 15 or less. Here, the ODF intensity in the {100}<011> orientation is an ODF value at φ1=0° and Φ=0° of the ODF created using the EBSD data when the area ratio of the specific oriented grains is measured. Since the {411}<011> orientation has excellent magnetic properties and has a lower stress sensitivity than that of the {100}<011> orientation, there is little magnetic deterioration in the interlocking core or the like. By setting the ODF intensity of the {100}<011> orientation after the skin pass rolling (before the final annealing) to 15 or less, the {411}<011> orientation after the subsequent final annealing is strengthened (the area ratio of the grains having a crystal orientation in the {411}<011> orientation is increased).

The non-oriented electrical steel sheet according to the present embodiment can be widely applied to applications where magnetic properties (high magnetic flux density and low iron loss) are required by forming a core, and can be applied to uses that require high strength, such as rotors.

Next, an example of a method for manufacturing the non-oriented electrical steel sheet according to the present embodiment will be described. In the present embodiment, hot rolling, cold rolling, process annealing, second cold rolling (skin pass rolling), and final annealing are performed.

In the hot rolling, a steel satisfying the above-described chemical composition is hot-rolled to manufacture a hot-rolled sheet. A hot rolling step includes a heating step and a rolling step.

The steel is, for example, a slab manufactured by ordinary continuous casting, and the steel having the above-described chemical composition is manufactured by a well-known method. For example, molten steel is manufactured in a converter, or an electric furnace. The manufactured molten steel is secondarily refined with a degassing facility or the like to obtain molten steel having the above chemical composition. A slab is cast using the molten steel by a continuous casting method or an ingot-making method. The cast slab may be subjected to blooming.

In the heating step, it is preferable to heat the steel having the above-described chemical composition to 1,000° C. to 1,200° C. Specifically, the steel is loaded into a heating furnace or a soaking furnace and heated in the furnace. A holding time at the heating temperature in the heating furnace or the soaking furnace is not particularly limited, but is, for example, 30 to 200 hours.

In the rolling step, the steel heated by the heating step is subjected to a plurality of passes of rolling to manufacture the hot-rolled sheet. Here, the "pass" means that a steel sheet passes through one rolling stand having a pair of work rolls and receives a rolling reduction. In the hot rolling, for example, the plurality of passes of rolling may be performed by performing tandem rolling using a tandem rolling mill including a plurality of rolling stands arranged in a row (each rolling stand has a pair of work rolls), or the plurality of passes of rolling may be performed by performing reverse rolling in which a pair of work rolls are provided. From the viewpoint of productivity, it is preferable that the plurality of passes of rolling is performed using the tandem rolling mill.

Rolling in the rolling step (rough rolling and finish rolling) is performed at a temperature in a γ region (Ar1 point or higher). That is, the hot rolling is performed so that a temperature (finish rolling temperature FT (° C.)) at the time of passing through the final pass of finish rolling becomes the Ar1 point or higher. In addition, it is preferable to perform the hot rolling so that the finish rolling temperature FT becomes an Ac3 point or lower. By performing the hot rolling so that the finish rolling temperature FT becomes the Ac3 point or lower, it is possible to preferably introduce strain into the grains in combination with cooling and the like described below, and as a result, A411-011 can be increased. When the finish rolling temperature FT is higher than the Ac3 point, it is not possible to preferably introduce strain into the grains, and as a result, there are cases where a desired A411-011 cannot be obtained.

The Ar1 point can be obtained from a change in thermal expansion of a steel sheet being cooled at an average cooling rate of 1° C./sec. In addition, the Ac3 point and an Ac1 point, which will be described later, can be obtained from a change in thermal expansion of a steel sheet being heated at an average heating rate of 1° C./sec.

Here, the finish rolling temperature FT means a surface temperature (° C.) of the steel sheet on an exit side of the rolling stand where a rolling reduction of the final pass is performed in the rolling step of the hot rolling step. The finish rolling temperature FT can be measured, for example, by a thermometer installed on the exit side of the rolling stand where the rolling reduction of the final pass is performed. For example, in a case where an overall length of the steel sheet is divided into 10 equal sections in the rolling direction, the finish rolling temperature FT means an average value of temperature measurement results of the sections except for one front end section and one rear end section.

Thereafter, austenite is transformed into ferrite by cooling after the rolling step, whereby grains that have a high strain and are appropriately fine are obtained. As for cooling conditions, cooling is started after 0.10 seconds after the final pass of the finish rolling, and after 3 seconds, cooling is performed so that the surface temperature of the hot-rolled sheet becomes 300° C. or higher and the Ar1 point or lower. Here, in the present embodiment, it is not preferable to perform rapid cooling immediately after the hot rolling. Here, rapid cooling immediately after the hot-rolled sheet (immediate rapid cooling) means that water cooling is started within 0.10 seconds after the final pass of the finish rolling, or cooling is performed so that the surface temperature of the hot-rolled sheet after 3 seconds becomes lower than 300° C. Such immediate rapid cooling can be performed by performing water cooling such that water is applied to the work rolls in the final pass of the finish rolling without performing air cooling after the finish rolling. In the present embodiment, since such immediate rapid cooling is not performed, a special rapid cooling apparatus is not required, and there is an advantage in terms of manufacturing cost. In addition, by performing cooling other than the immediate rapid cooling as described above, a suitable grain size at which the grains are not excessively refined is achieved, and then cold rolling is performed, so that the α-fiber is developed after the process annealing, and the {411}<011> orientation, which is normally difficult to develop after subsequent skin pass rolling and final annealing, can be developed.

A cooling stop temperature in the cooling after the hot rolling step is not particularly limited, but is preferably set to a temperature range of 500° C. or lower from the viewpoint of retaining the strain amount.

In addition, it is presumed that a texture of the hot-rolled sheet becomes a structure in which unrecrystallized austenite is transformed in a case where immediate rapid cooling is performed and becomes a structure in which partially recrystallized austenite is transformed in a case where cooling other than the immediate rapid cooling is performed. In the case of performing the immediate rapid cooling after the finish rolling, the {100}<011> orientation is developed in the structure after the subsequent final annealing, and in the case of performing cooling other than the immediate rapid cooling after the finish rolling, the {411}<011> orientation is developed in the structure after the subsequent final annealing. Therefore, it is considered important to transform the partially recrystallized austenite in order to strengthen the {411}<011> orientation.

Here, it is preferable that the cooling conditions are set such that an average grain size of the hot-rolled sheet before the cold rolling becomes 3 to 10 μm. When the grains become too coarse, the α-fiber does not easily develop after the cold rolling and process annealing, and there are cases where a desired {411}<011> ratio cannot be obtained. In addition, when the grains are excessively refined, a desired {411}<011> ratio cannot be obtained. Therefore, in order to set the average grain size of the hot-rolled sheet before the cold rolling to 3 to 10 μm, it is preferable to set the temperature to the Ar1 point or lower within 3 seconds after the final pass of the finish rolling. A method for measuring the grain size is, for example, an intercept method.

In addition, the surface temperature of the hot-rolled sheet after 3 seconds after the final pass of the finish rolling is measured by the following method. In a hot rolling facility line of the non-oriented electrical steel sheet, a cooling apparatus and a transport line (for example, a transport roller) are disposed downstream of the hot rolling mill. The thermometer for measuring the surface temperature of the hot-rolled sheet is disposed on the exit side of the rolling stand that performs the final pass in the hot rolling mill. In addition, a plurality of thermometers are also arranged in the transport rollers disposed downstream of the rolling stand along the transport line. The cooling apparatus is disposed downstream of the rolling stand that performs the final pass. A thermometer is disposed on an inlet side of a water cooling apparatus. The cooling apparatus may be, for example, a well-known water cooling apparatus or a well-known forced air cooling device. Preferably, the cooling apparatus is a water cooling apparatus. A cooling liquid of the water cooling apparatus may be water or a mixed fluid of water and air.

The surface temperature of the hot-rolled sheet is measured by the thermometer disposed in the hot rolling facility line. Then, a temperature after 3 seconds after the final pass of the finish rolling is obtained.

Thereafter, the hot-rolled sheet is coiled and cold-rolled without being subjected to hot-rolled sheet annealing. The hot-rolled sheet annealing mentioned here means, for example, a heat treatment performed on the hot-rolled sheet in a heating temperature range of 800° C. to 1100° C. A holding time at the heating temperature during the hot-rolled sheet annealing is, for example, 1 minute or longer.

When the hot-rolled sheet annealing is performed, intragranular strain cannot be preferably controlled, and as a result, a desired {411}<011> ratio cannot be obtained, which is not preferable.

The cold rolling is performed on the hot-rolled sheet without performing the hot-rolled sheet annealing on the hot-rolled sheet. In the cold rolling, for example, a plurality of passes of rolling may be performed by performing tandem rolling using a tandem rolling mill including a plurality of rolling stands arranged in a row (each rolling stand has a pair of work rolls). Alternatively, one pass or a plurality of passes of rolling may be performed by performing reverse rolling using a Sendzimir rolling mill or the like in which a pair of work rolls are provided. From the viewpoint of productivity, it is preferable that the plurality of passes of rolling is performed using the tandem rolling mill.

In the cold rolling, cold rolling is performed without performing an annealing treatment during the cold rolling. For example, in a case where the cold rolling is performed in the plurality of passes by performing the reverse rolling, the plurality of passes of cold rolling are performed without an annealing treatment between the passes of the cold rolling. The cold rolling may be performed in only one pass using a reverse type rolling mill. In the case of performing the cold rolling using a tandem type rolling mill, the cold rolling is performed continuously in the plurality of passes (passes at each rolling stand).

In a case where annealing is performed during cold rolling in order to prevent brittle cracking, cold rolling with a small difference in rolling reduction before and after the cold rolling (for example, about 10%) is often performed. Therefore, the "annealing during cold rolling" mentioned here and the "process annealing" performed before the skin pass rolling in the present embodiment can be distinguished from each other by the difference in the rolling reduction of the cold rolling before and after the annealing. In addition, in a case where annealing is performed between stages of cold rolling in a two-stage cold rolling process or the like, cold rolling with a high rolling reduction (for example, about 40%) is often performed after the annealing. Therefore, the "annealing between stages of cold rolling" mentioned here and the "process annealing" performed before the skin pass rolling in the present embodiment can be distinguished from each other by the rolling reduction of the subsequently performed cold rolling.

In the present embodiment, a rolling reduction RR1(%) in the cold rolling is preferably set to 75% to 95%. Here, the rolling reduction RR1 is defined as follows.

Rolling reduction RR1(%)=(1−sheet thickness after rolling in final pass of cold rolling/sheet thickness before rolling in first pass of cold rolling)×100

When the cold rolling is ended, the process annealing is subsequently performed. In the present embodiment, it is preferable to control a process annealing temperature T1 (° C.) to the Ac1 point or lower. When the process annealing temperature is higher than the Ac1 point, a part of the structure of the steel sheet is transformed into austenite, and an area ratio of {411}<011> oriented grains in the steel sheet decreases. When the process annealing temperature is too low, recrystallization does not occur, the {411}<011> oriented grains do not sufficiently grow during the subsequent skin pass rolling and final annealing, and there are cases where the magnetic flux density of the non-oriented electrical steel sheet is not high. Therefore, the process annealing temperature T1 (° C.) is preferably set to 600° C. or higher.

Here, the process annealing temperature T1 (° C.) is a sheet temperature (a temperature of a surface of the steel sheet) in the vicinity of an extraction port of an annealing furnace. The sheet temperature in the annealing furnace can be measured by a thermometer provided at the extraction port of the annealing furnace.

A holding time at the process annealing temperature T1 in a process annealing step may be a time well known to those skilled in the art. The holding time at the process annealing temperature T1 is, for example, 5 to 60 seconds, but the holding time at the process annealing temperature T1 is not limited thereto. In addition, a temperature rising rate up to the process annealing temperature T1 may also be a well-known condition. The temperature rising rate up to the process annealing temperature T1 is, for example, 10.0 to 20.0° C./sec, but the temperature rising rate up to the process annealing temperature T1 is not limited thereto.

An atmosphere during the process annealing is not particularly limited, and an atmospheric gas (drying) containing, for example, 20% of $H_2$ and a remainder including $N_2$ is used as the atmosphere during the process annealing. A cooling rate of the steel sheet after the process annealing is not particularly limited, and the cooling rate is, for example, 5.0 to 60.0° C./sec.

When the process annealing is ended under the above conditions, the obtained cold-rolled steel sheet has an α-fiber ratio (within a tolerance of 10°) of 15% or more when measured by EBSD. As described above, in order to set the $\alpha$-fiber ratio (within a tolerance of 10°) to 15% or more in a stage before the skin pass rolling, it is effective to use a chemical composition of an $\alpha$-$\gamma$ transformation system (a chemical composition with a high concentration of $\gamma$ former elements including Mn, Ni, and Cu) and to set the above-described conditions from the hot rolling to the process annealing, and it is particularly effective to control cooling conditions after the finish rolling. By transforming the partially recrystallized austenite into ferrite, performing the cold rolling on the hot-rolled sheet having an average grain size of 3 to 10 μm after hot rolling, and thereafter performing the process annealing, the $\alpha$-fiber that tends to generate the {411}<011> orientation is developed. As described above, when immediate rapid cooling is performed after the finish rolling, a structure into which the unrecrystallized austenite is transformed is formed, and a structure into which the partially recrystallized austenite is transformed is not formed.

The non-oriented electrical steel sheet according to the present embodiment can be obtained by performing skin pass rolling and further final annealing on the cold-rolled steel sheet manufactured by the above-described method under the conditions described below.

After the process annealing is ended, skin pass rolling is subsequently performed. Specifically, the cold-rolled steel sheet after the process annealing step is subjected to skin pass rolling (cold rolling with a light rolling reduction) at room temperature and in the air. For the skin pass rolling here, for example, a reverse rolling mill represented by the above-described Sendzimir rolling mill or a tandem rolling mill is used.

In the skin pass rolling, rolling is performed without performing an annealing treatment during the rolling. For example, in a case where the skin pass rolling is performed in a plurality of passes by performing reverse rolling, rolling is performed a plurality of times without an annealing treatment between the passes. The skin pass rolling may be performed in only one pass using a reverse type rolling mill. In addition, in a case of performing the skin pass rolling using a tandem type rolling mill, the rolling is performed continuously in the plurality of passes (passes at each rolling stand).

As described above, in the present embodiment, after strain is introduced into the steel sheet by the hot rolling and the cold rolling, the strain introduced into the steel sheet is temporarily reduced by the process annealing. Then, the skin pass rolling is performed. Accordingly, while the strain introduced excessively by the cold rolling is reduced in the process annealing, by performing the process annealing, preferential recrystallization of grains having a crystal orientation in the {111} plane in the sheet surface of the steel sheet is suppressed, and grains having a crystal orientation in the {411}<011> orientation are left. In addition, an appropriate strain amount is introduced into each grain in the steel sheet during the skin pass rolling to facilitate the occurrence of grain growth due to bulging in the final annealing in the next step.

In the present embodiment, a rolling reduction RR2 in the skin pass rolling is set to 5 to 20%. Here, the rolling reduction RR2 is defined as follows.

Rolling reduction RR2(%)=(1−sheet thickness after rolling in final pass of skin pass rolling/sheet thickness before rolling in first pass of skin pass rolling)×100

Here, when the rolling reduction RR2 is less than 5%, the strain amount becomes too small, and a final annealing time required for grain growth due to bulging increases. In addition, when the rolling reduction RR2 is more than 20%, the strain amount becomes too large, normal grain growth occurs instead of bulging, resulting in growth of {411}<148> and {111}<011> during the final annealing. Therefore, the rolling reduction RR2 is set to 5% to 20%.

The number of passes in the skin pass rolling may be only one (that is, only one rolling), or may be a plurality of passes of rolling.

As described above, by causing the steel sheet having the chemical composition of the $\alpha$-$\gamma$ transformation system to undergo recrystallization in the process annealing and performing the skin pass rolling under the above conditions, the above-described GOS value and the $\alpha$-fiber ratio can be obtained.

After the skin pass rolling, the final annealing is performed under conditions in which a final annealing temperature T2 is in a temperature range of 750° C. or higher and Ac1 point or lower and a holding time in the temperature range is 2 hours or longer. In a case where the final annealing temperature T2 (° C.) is set to lower than 750° C., grain growth due to bulging does not sufficiently occur. In this case, a development degree of the {411}<011> orientation decreases. In addition, when the final annealing temperature T2 is higher than Ac1 point, a part of the structure of the steel sheet is transformed into austenite, so that grain growth due to bulging does not occur, and a desired {411}<011> ratio cannot be obtained. In addition, in a case where the annealing time is shorter than 2 hours, even when the final annealing temperature T2 is 750° C. or higher and Ac1 point or lower, grain growth due to bulging does not sufficiently occur, and the development degree of the {411}<011> orientation decreases.

The upper limit of the annealing time of the finish annealing is not particularly limited, but the effect is saturated even if the annealing time exceeds 10 hours, so the preferable upper limit is 10 hours.

Here, the final annealing temperature T2 is a sheet temperature (the temperature of the surface of the steel sheet) in the vicinity of an extraction port of an annealing furnace. A furnace temperature of the annealing furnace can be measured by a thermometer provided at the extraction port of the annealing furnace.

A temperature rising rate TR2 up to the final annealing temperature T2 in a final annealing step may be any temperature rising rate well known to those skilled in the art, and a holding time Δt2 (sec) at the final annealing temperature T2 may be any time well known to those skilled in the art. Here, the holding time Δt2 means a holding time after the surface temperature of the steel sheet reaches the final annealing temperature T2.

A preferable temperature rising rate TR2 up to the final annealing temperature T2 in the final annealing step is set to 0.1° C./sec or faster and slower than 10.0° C./sec. When the temperature rising rate TR2 is 0.1° C./sec or faster and slower than 10.0° C./sec, grain growth due to bulging sufficiently occurs. In this case, the development degree of the {411}<011> crystal orientation is further increased, and grains on an ND plane at a center position of the sheet thickness are less likely to be uneven.

The temperature rising rate TR2 is obtained by the following method. A thermocouple is attached to the steel sheet having the above chemical composition and obtained by performing the steps from the hot rolling to the skin pass rolling to obtain a sample steel sheet. A temperature of the sample steel sheet to which the thermocouple is attached is increased, and a time from the start of the increase in temperature until the final annealing temperature T2 is reached is measured. The temperature rising rate TR2 is obtained based on the measured time.

The holding time Δt2 at the final annealing temperature T2 in the final annealing step is 2 hours or longer. When the holding time Δt2 is 2 hours or longer, grain growth of {411}<110> grains due to bulging occurs, and high-strengthening is achieved by grain refinement strengthening. In this case, the development degree of the {411}<011> crystal orientation is further increased, and grains on the ND plane at the center position of the sheet thickness are less likely to be uneven. A lower limit of the holding time Δt2 is 2 hours, and preferably 3 hours. As described above, an upper limit of the holding time Δt2 is preferably 10 hours, and more preferably 5 hours.

An atmosphere during the final annealing step is not particularly limited. An atmospheric gas (drying) containing, for example, 20% of $H_2$ and a remainder including $N_2$ is used as the atmosphere during the final annealing step. A cooling rate of the steel sheet after the final annealing is not particularly limited. The cooling rate is, for example, 5 to 20° C./sec.

The non-oriented electrical steel sheet after skin-pass rolling may be shipped without performing the finish annealing. For example, the processes up to skin-pass rolling are performed at a steel sheet manufacturing company, the non-oriented electrical steel sheet is punched or laminated at the core manufacturing company to which it is shipped, and then a stress relief annealing may be performed as an alternative to finish annealing under conditions of annealing temperature of 750° C. or higher and Ac1 point or lower and annealing time of 2 hours or longer.

As described above, the non-oriented electrical steel sheet according to the present embodiment can be manufactured.

The method for manufacturing the non-oriented electrical steel sheet according to the present embodiment is not limited to the above manufacturing steps.

For example, in the above manufacturing steps, shot blasting and/or pickling may be performed after the hot rolling and before the cold rolling. In the shot blasting, shot blasting is performed on the steel sheet after the hot rolling to fracture and remove scale formed on the surface of the steel sheet after the hot rolling. In the pickling, a pickling treatment is performed on the steel sheet after the hot rolling. For the pickling treatment, for example, a hydrochloric acid aqueous solution is used as a pickling bath. The scale formed on the surface of the steel sheet is removed by the pickling. The shot blasting may be performed after the hot rolling and before the cold rolling, and then the pickling may be performed. Alternatively, the pickling may be performed after the hot rolling and before the cold rolling, and the shot blasting may not be performed. The shot blasting may be performed after the hot rolling and before the cold rolling, and the pickling treatment may not be performed. The shot blasting and pickling are optional steps. Therefore, it is not necessary to perform both a shot blasting step and a pickling step after the hot rolling and before the cold rolling.

In the method for manufacturing the electrical steel sheet according to the present embodiment, coating may be further performed after the final annealing. In the coating, an insulation coating is formed on the surface of the steel sheet after the final annealing.

The type of the insulation coating is not particularly limited. The insulation coating may be an organic component or an inorganic component. The insulation coating may contain an organic component and an inorganic component. Examples of the inorganic component include a dichromic acid-boric acid-based component, a phosphoric acid-based component, and a silica-based component. Examples of the organic component include a general acrylic-based resin, an acrylic-styrene-based resin, an acrylic-silicone-based resin, a silicone-based resin, a polyester-based resin, an epoxy-based resin, and a fluorine-based resin. In consideration of coatability, a preferable resin is an emulsion type resin. An insulation coating that exhibits adhesiveness by heating and/or pressurizing may be applied. Examples of the insulation coating having adhesiveness include an acrylic-based resin, a phenol-based resin, an epoxy-based resin, and a melamine-based resin.

The coating is an arbitrary step. Therefore, it is not necessary to perform the coating after the final annealing.

The non-oriented electrical steel sheet according to the present embodiment is not limited to the above-described manufacturing method. The non-oriented electrical steel sheet according to the present embodiment is not limited to the above-described manufacturing method as long as the area ratio of the grains having a crystal orientation in the {411><011> orientation (within a tolerance of 10°) when measured by EBSD is 15.0% or more, and the average grain size is 10.0 μm to 40.0 μm.

EXAMPLES

Next, the non-oriented electrical steel sheet according to the embodiment of the present invention will be described in detail with reference to Examples. Examples shown below are merely examples of the non-oriented electrical steel sheet according to the embodiment of the present invention, and the non-oriented electrical steel sheet according to the present invention is not limited to the following examples.

First Example

Molten steel was cast to produce an ingot having the composition shown in Table 1-1. Here, a left side of an expression represents a value of the left side of Expression (1). In addition. Mg and the like represent the total amount of one or more selected from the group consisting of Mg, Ca, Sr, Ba, Ce, La, Nd, Pr, Zn, and Cd. Thereafter, the produced ingot was heated to 1,150° C., hot-rolled, and finish-rolled at the finish rolling temperature FT shown in Table 2. Cooling was then performed under the cooling conditions shown in Table 2 after the final pass (a time until the cooling is started after the final pass, and a temperature of a steel sheet after 3 seconds after the steel sheet had passed through the final pass).

Next, the hot-rolled sheet was not subjected to hot-rolled sheet annealing, scale was removed by pickling, and cold rolling was performed at the rolling reduction RR1 shown in Table 2. Then, process annealing was performed in an atmosphere of 20% hydrogen and 80% nitrogen. The process annealing was performed for 30 seconds while controlling a process annealing temperature T1 to the temperature shown in Table 2.

In addition, No. 24, hot-rolled sheet annealing for holding the hot-rolled sheet at 1,000° C. for 1 minute was performed.

Next, except for No. 11, skin pass rolling was performed at the rolling reduction RR2 shown in Table 2. Then, final annealing was performed at the final annealing temperature T2 shown in Table 2 in an atmosphere of 100% hydrogen. Here, a holding time Δt2 at the final annealing temperature T2 was set to 2 hours. Before the finish annealing, the number average value Gs of the GOS values was calculated under the measurement conditions described above.

In addition, in order to examine a texture after the final annealing, a part of the non-oriented electrical steel sheet was cut off, and the cut test piece was reduced to a ½ thickness. A {411}<011> ratio was obtained by observing a measurement region by EBSD under the above-described measurement conditions. The results of each are shown in Table 3.

In addition, in order to examine magnetic properties and a tensile strength after the final annealing, a magnetic flux density B50 and an iron loss W10/400 were measured. In addition, as an index of stress sensitivity, an iron loss deterioration percentage of an iron loss W10/50 under a compressive stress was obtained.

Regarding the magnetic flux density B50, a 55 mm square sample was collected as a measurement sample in two directions, a 0° direction and a 45° direction with respect to a rolling direction. The magnetic flux density B50 was measured for these two types of samples by the above-described method. An average value of magnetic flux densities in the 45° direction and a 135° direction with respect to the rolling direction was defined as the magnetic flux density B50 in the 45° direction, and an average value in the 0° direction, the 45° direction, a 90° direction, and the 1350 direction with respect to the rolling direction was defined as an all-directional average magnetic flux density B50. In a case where the magnetic flux density B50 in the 45° direction was 1.70 T or more, the non-oriented electrical steel sheet was determined to be a non-oriented electrical steel sheet having a high magnetic flux density and was thus determined to be acceptable. On the other hand, in a case where the magnetic flux density B50 in the 45° direction was less than 1.70 T, the non-oriented electrical steel sheet was not determined to be a non-oriented electrical steel sheet having a high magnetic flux density and was thus determined to be unacceptable. In addition, in a case where the magnetic flux density B50 in the 450 direction was 1.70 T or more and the all-directional average magnetic flux density B50 was 1.55 Tor more, the non-oriented electrical steel sheet was determined to be a non-oriented electrical steel sheet having a higher magnetic flux density.

Regarding the iron loss W10/400, the iron loss W10/400 in the 450 direction was obtained by the above-described method using the above-mentioned sample collected in the 45° direction with respect to the rolling direction.

Furthermore, regarding the iron loss deterioration percentage $W_x$ [%] of the iron loss W10/50 under a compressive stress, in a case where an iron loss W10/50 with no stress was indicated as W10/50(0) and an iron loss W10/50 under a compressive stress of 10 MPa was indicated as W10/50 (10), the iron loss deterioration percentage $W_x$ was calculated by the following expression. The iron loss W10/50 was obtained by measuring an all-directional average energy loss (W/kg) that had occurred when an AC magnetic field of 40 Hz was applied to achieve a maximum magnetic flux density of 1.0 T using the sample collected in the 45° direction with respect to the rolling direction and a single sheet magnetic property measuring device.

In a case where the iron loss W10/400 in the 45° direction was 14.0 W/kg or less and the iron loss deterioration percentage $W_x$ was 40.0% or less, the non-oriented electrical steel sheet was determined to be a non-oriented electrical steel sheet having a low iron loss and was thus determined to be acceptable. On the other hand, in a case where the iron loss W10/400 in the 450 direction was more than 14.0 W/kg, or in a case where the iron loss deterioration percentage $W_x$ was more than 40.0%, the non-oriented electrical steel sheet was not determined to be a non-oriented electrical steel sheet having a low iron loss and was thus determined to be unacceptable.

The tensile strength was obtained by collecting a JIS No. 5 test piece whose longitudinal direction was the rolling direction of the steel sheet and conducting a tensile test according to JIS Z 2241:2011. In a case where the tensile strength was 600 MPa or more, the non-oriented electrical steel sheet was determined to be a non-oriented electrical steel sheet having a high strength and was thus determined to be acceptable. On the other hand, in a case where the tensile strength was less than 600 MPa, the non-oriented electrical steel sheet was not determined to be a non-oriented electrical steel sheet having a high strength and was thus determined to be unacceptable.

The measurement results are shown in Table 3.

$$W_x=\{W10/50(10)-W10/50(o)\}/W10/50(0)$$

TABLE 1

| Item No. | C [mass %] | Si [mass %] | sol. Al [mass %] | S [mass %] | N [mass %] | Ti [mass %] | Mn [mass %] | Ni [mass %] | Cu [mass %] | Co [mass %] | Sn [mass %] | Sb [mass %] | P [mass %] | Mg and the like [mass %] | Left side of formula [mass %] | Transformation point Ar1 point [° C.] | Transformation point Ac1 point [° C.] | Transformation point Ac3 point [° C.] |
|---|---|---|---|---|---|---|---|---|---|---|---|---|---|---|---|---|---|---|
| | Chemical composition (remainder including Fe and impurities) | | | | | | | | | | | | | | | | | |
| 1 | 0.0018 | 2.5 | 0.005 | 0.0018 | 0.0011 | 0.0015 | 3.0 | 0.0 | 0.0 | 0.0 | 0.00 | 0.00 | 0.020 | 0.000 | 3.41 | 779 | 932 | 982 |
| 2 | 0.0018 | 2.5 | 0.005 | 0:0018 | 0.0011 | 0.0000 | 3.0 | 0.0 | 0.0 | 0.0 | 0.00 | 0.00 | 0.020 | 0.000 | 3.41 | 779 | 932 | 982 |
| 3 | 0.0018 | 2.5 | 0.300 | 0.0018 | 0.0011 | 0.0020 | 2.0 | 0.0 | 0.0 | 0.0 | 0.00 | 0.00 | 0.020 | 0.000 | 0.82 | — | — | — |
| 4 | 0.0012 | 2.4 | 0.120 | 0.0015 | 0.0014 | 0.0020 | 2.8 | 0.2 | 0.0 | 0.0 | 0.03 | 0.01 | 0.010 | 0.004 | 3.42 | 777 | 929 | 979 |
| 5 | 0.0018 | 2.5 | 0.005 | 0.0018 | 0.0011 | 0.0070 | 3.0 | 0.0 | 0.0 | 0.0 | 0.00 | 0.00 | 0.020 | 0.000 | 3.41 | 779 | 932 | 982 |
| 6 | 0.0009 | 2.5 | 0.070 | 0.0008 | 0.0008 | 0.0015 | 3.5 | 0.0 | 0.2 | 0.2 | 0.00 | 0.11 | 0.080 | 0.000 | 4:24 | 657 | 780 | 850 |
| 7 | 0.0009 | 2.5 | 0.800 | 0.0008 | 0.0008 | 0.0005 | 4.0 | 0.0 | 0.0 | 0.0 | 0.00 | 0.11 | 0.100 | 0.000 | 3.50 | 759 | 908 | 957 |
| 8 | 0.0012 | 2.6 | 0.500 | 0.0015 | 0.0014 | 0:0050 | 2.6 | 0:0 | 0.2 | 0.0 | 0.15 | 0,00 | 0.010 | 0.000 | 1.71 | 953 | 1049 | 1088 |
| 9 | 0.0012 | 1.0 | 0.005 | 0.0015 | 0.0014 | 0.0000 | 2.5 | 0.0 | 0.0 | 0.0 | 0.15 | 0.00 | 0.010 | 0.000 | 3.95 | 673 | 820 | 848 |
| 10 | 0.0012 | 3.5 | 0.800 | 0.0015 | 0.0014 | 0.0015 | 5.2 | 0.0 | 0.0 | 0.0 | 0.15 | 0.00 | 0.010 | 0.000 | 5.26 | 633 | 760 | 812 |
| 11 | 0.0022 | 3.4 | 0.020 | 0.0042 | 0.0023 | 0.0015 | 3.7 | 0.0 | 0.0 | 0.0 | 0.00 | 0.00 | 0.006 | 0.005 | 3.94 | 699 | 897 | 975 |
| 12 | 0.0022 | 3.4 | 0.020 | 0.0042 | 0.0023 | 0.0015 | 3.7 | 0.0 | 0.0 | 0.0 | 0.00 | 0.00 | 0.006 | 0.005 | 3.94 | 699 | 897 | 975 |
| 13 | 0.0018 | 2.5 | 0.005 | 0.0018 | 0.0011 | 0.0015 | 3.0 | 0.0 | 0.0 | 0.0 | 0.00 | 0.00 | 0.020 | 0.000 | 3.41 | 779 | 932 | 982 |
| 14 | 0.0054 | 1.8 | 0.200 | 0.0018 | 0.0011 | 0.0015 | 3.0 | 0.0 | 0.0 | 0.0 | 0.00 | 0.00 | 0.020 | 0.000 | 3.72 | 732 | 901 | 966 |
| 15 | 0.0018 | 3.5 | 0.300 | 0.0012 | 0.0013 | 0.0015 | 4.0 | 0.0 | 0.0 | 0.0 | 0.00 | 0.00 | 0.020 | 0.000 | 3.82 | 708 | 899 | 958 |
| 16 | 0.0018 | 2.5 | 0.250 | 0.0018 | 0.0011 | 0.0015 | 0.0 | 2.8 | 0.0 | 0.0 | 0.00 | 0.00 | 0.020 | 0.000 | 3.92 | 675 | 881 | 934 |
| 17 | 0.0018 | 2.0 | 0.005 | 0.0018 | 0.0011 | 0.0015 | 0.0 | 0.0 | 4.0 | 0.0 | 0.00 | 0.00 | 0.020 | 0.000 | 1.91 | 938 | 1038 | 1067 |
| 18 | 0.0022 | 3:4 | 0.020 | 0.0042 | 0.0023 | 0.0015 | 3.7 | 0.0 | 0.0 | 0.0 | 0.00 | 0.00 | 0.006 | 0.005 | 3.94 | 699 | 897 | 975 |

TABLE 1-continued

| | Chemical composition (remainder including Fe and impurities) | | | | | | | | | | | | | | | Transformation point | | |
|---|---|---|---|---|---|---|---|---|---|---|---|---|---|---|---|---|---|---|
| Item No. | C [mass %] | Si [mass %] | sol. Al [mass %] | S [mass %] | N [mass %] | Ti [mass %] | Mn [mass %] | Ni [mass %] | Cu [mass %] | Co [mass %] | Sn [mass %] | Sb [mass %] | P [mass %] | Mg and the like [mass %] | Left side of formula [mass %] | Ar1 point [° C.] | Ac1 point [° C.] | Ac3 point [° C.] |
| 19 | 0.0009 | 2.5 | 0.800 | 0.0008 | 0.0008 | 0.0015 | 4.0 | 0.0 | 0.0 | 0.0 | 0.00 | 0.11 | 0.100 | 0.000 | 3.50 | 759 | 908 | 957 |
| 20 | 0.0009 | 2.5 | 0.070 | 0.0008 | 0.0008 | 0.0015 | 3.5 | 0.0 | 0.2 | 0.2 | 0.00 | 0.11 | 0.080 | 0.000 | 4.24 | 657 | 780 | 850 |
| 21 | 0.0018 | 2.5 | 0.005 | 0.0018 | 0.0011 | 0.0015 | 3.0 | 0.0 | 0.0 | 0.0 | 0.00 | 0.00 | 0.020 | 0.000 | 3.41 | 779 | 932 | 982 |
| 22 | 0.0018 | 2.5 | 0.005 | 0.0018 | 0.0011 | 0.0015 | 3.0 | 0.0 | 0.0 | 0.0 | 0:00 | 0.00 | 0.020 | 0.000 | 3.41 | 779 | 932 | 982 |
| 23 | 0.0018 | 1.8 | 0.200 | 0.0018 | 0.0011 | 0.0015 | 3.0 | 0.0 | 0.0 | 0.0 | 0.00 | 0.00 | 0:020 | 0.000 | 3.72 | 732 | 901 | 966 |
| 24 | 0:0018 | 2.5 | 0.005 | 0.0018 | 0.0011 | 0.0015 | 3.0 | 0.0 | 0.0 | 0.0 | 0.00 | 0.00 | 0.020 | 0:000 | 3.41 | 779 | 932 | 982 |

Underlines indicate outside of the ranges of the present invention.

TABLE 2

| | Hot rolling step | | | Cold rolling step | Process annealing step | Skin pass rolling step | Final annealing step | | |
|---|---|---|---|---|---|---|---|---|---|
| Item No. | Finish rolling temperature FT [° C.] | Start of cooling [sec] | Temperature after 3 seconds [° C.] | Rolling reduction RR1 of cold rolling [%] | Process annealing temperature T1 [° C.] | Rolling reduction RR2 of skin pass rolling [%] | Final annealing temperature T2 [° C.] | Final annealing time Δt2 [hour] | Evaluation |
| 1 | 950 | 0.10 | 700 | 86 | 700 | 15 | 800 | 3 | Present Invention Example |
| 2 | 950 | 0.10 | 200 | 86 | 700 | 15 | 800 | 3 | Comparative Example |
| 3 | 950 | 0.10 | 700 | 86 | 700 | 15 | 800 | 3 | Comparative Example |
| 4 | 950 | 0.50 | 400 | 86 | 700 | 15 | 800 | 3 | Present In vention Example |
| 5 | 650 | 0.10 | 550 | 86 | 700 | 15 | 800 | 3 | Comparative Example |
| 6 | 850 | 0.08 | 600 | 86 | 700 | 15 | 750 | 3 | Comparative Example |
| 7 | 850 | 0.12 | 600 | 86 | 700 | 15 | 800 | 3 | Present Invention Example |
| 8 | 1050 | 0.50 | 400 | 86 | 700 | 15 | 800 | 3 | Present Invention Example |
| 9 | 950 | 0.50 | 400 | 86 | 700 | 15 | 800 | 3 | Comparative Example |
| 10 | 850 | 0.12 | 400 | 86 | 700 | 15 | 750 | 3 | Comparative Example |
| 11 | 950 | 0.10 | 650 | 86 | 700 | 0 | 800 | 3 | Comparative Example |
| 12 | 950 | 0.10 | 650 | 86 | 700 | 25 | 800 | 3 | Comparative Example |
| 13 | 1050 | 0.10 | 400 | 86 | 700 | 15 | 800 | 3 | Comparative Example |
| 14 | 900 | 0:10 | 650 | 86 | 700 | 15 | 800 | 3 | Present Invention Example |
| 15 | 900 | 0.10 | 600 | 86 | 700 | 15 | 800 | 3 | Present Invention Example |
| 16 | 900 | 0.10 | 600 | 86 | 700 | 15 | 800 | 3 | Present Invention Example |
| 17 | 950 | 0.10 | 700 | 86 | 700 | 15 | 008 | 3 | Present Invention Example |
| 18 | 950 | 0.10 | 250 | 86 | 700 | 15 | 800 | 3 | Comparative Example |
| 19 | 850 | 0.10 | 600 | 86 | 950 | 15 | 800 | 3 | Comparative Example |
| 20 | 800 | 0.10 | 600 | 86 | 500 | 15 | 750 | 3 | Comparative Example |
| 21 | 950 | 0.10 | 700 | 86 | 700 | 15 | 700 | 3 | Comparative Example |
| 22 | 950 | 0.10 | 700 | 86 | 700 | 15 | 1000 | 3 | Comparative Example |

TABLE 2-continued

| Item No. | Hot rolling step: Finish rolling temperature FT [° C.] | Hot rolling step: Start of cooling [sec] | Hot rolling step: Temperature after 3 seconds [° C.] | Cold rolling step: Rolling reduction RR1 of cold rolling [%] | Process annealing step: Process annealing temperature T1 [° C.] | Skin pass rolling step: Rolling reduction RR2 of skin pass rolling [%] | Final annealing step: Final annealing temperature T2 [° C.] | Final annealing step: Final annealing time Δt2 [hour] | Evaluation |
|---|---|---|---|---|---|---|---|---|---|
| 23 | 900 | 0.10 | 650 | 86 | 700 | 15 | 850 | 1 | Comparative Example |
| 24* | 950 | 0.10 | 700 | 86 | 700 | 15 | 800 | 3 | Comparative Example |

Underlines indicate manufacturing conditions that are not preferable.

*Hot-rolled sheet annealing for holding the hot-rolled sheet at 1,000° C. for 1 minute was performed.

TABLE 3

| Item No. | After skin pass Gs [−] | Texture after final annealing [411]<011> ratio [%] | Sheet thickness [mm] | Micro-structure Average grain size [μm] | Magnetic properties: B50 (all-directional) [T] | Magnetic properties: B50 (45°) [T] | Magnetic properties: W10/400 (45°) [W/kg] | Magnetic properties: Iron loss deterioration percentage $W_x$ [%] | Mechanical properties. Tensile strength [MPa] | Evaluation |
|---|---|---|---|---|---|---|---|---|---|---|
| 1 | 2.2 | 24.3 | 0.3 | 28.9 | 1.64 | 1.79 | 12.0 | 31.3 | 655 | Present Invention Example |
| 2 | 1.7 | 11.2 | 0.3 | 57.3 | 1.62 | 1.73 | 12.7 | 50.7 | 566 | Comparative Example |
| 3 | 2.1 | 8.3 | 0.3 | 26.7 | 1.65 | 1.60 | 14.3 | 54.5 | 666 | Comparative Example |
| 4 | 2.3 | 22.7 | 0.3 | 25.8 | 1.74 | 1.70 | 13.2 | 28.9 | 670 | Present Invention Example |
| 5 | 2.6 | 9.2 | 0.3 | 12.5 | 1.58 | 1.56 | 18.1 | 46.2 | 766 | Comparative Example |
| 6 | 1.8 | 12.5 | 0:3 | 27.1 | 1.62 | 1.73 | 12.9 | 50.7 | 664 | Comparative Example |
| 7 | 2.1 | 28.9 | 0.3 | 37.8 | 1.64 | 1.72 | 13.4 | 30.5 | 620 | Present Invention Example |
| 8 | 2.0 | 16.3 | 0.3 | 14.3 | 1.61 | 1.70 | 13.3 | 30.4 | 748 | Present Invention Example |
| 9 | 2.0 | 27.5 | 0.3 | 71.1 | 1.67 | 1.74 | 15.4 | 30.1 | 537 | Comparative Example |
| 10 | 2.3 | 25.6 | 0.3 | 31.6 | 1.51 | 1.48 | 13.2 | 31.9 | 644 | Comparative Example |
| 11 | 0.2 | 11.4 | 0.3 | 34.2 | 1.58 | 1.60 | 14.3 | 52.1 | 633 | Comparative Example |
| 12 | 3.1 | 12.1 | 0.3 | 32.5 | 1.57 | 1.63 | 14.4 | 33.5 | 640 | Comparative Example |
| 13 | 2.1 | 13.2 | 0.3 | 31.2 | 1.61 | 1.74 | 13.1 | 51.1 | 655 | Comparative Example |
| 14 | 2.1 | 20.8 | 0.3 | 22.0 | 1.64 | 1.78 | 13.3 | 32.7 | 630 | Present Invention Example |
| 15 | 2.2 | 22.7 | 0.3 | 28.8 | 1.61 | 1.71 | 12.1 | 31.0 | 674 | Present Invention Example |
| 16 | 2.0 | 22.0 | 0.3 | 30.6 | 1.62 | 1.77 | 13.0 | 30.5 | 658 | Present Invention Example |
| 17 | 2.2 | 21.4 | 0.3 | 28.7 | 1.62 | 1.76 | 12.8 | 30.8 | 666 | Present Invention Example |
| 18 | 1.9 | 13.9 | 0.3 | 27.5 | 1.61 | 1.73 | 13.3 | 54.2 | 672 | Comparative Example |
| 19 | 2.6 | 10.8 | 0.3 | 26.4 | 1.54 | 1.58 | 20.8 | 52.8 | 677 | Comparative Example |
| 20 | 2.9 | 14.0 | 0.3 | 30.6 | 1.53 | 1.64 | 16.1 | 51.1 | 642 | Comparative: Example |
| 21 | 2.2 | 13.1 | 0.3 | 11.7 | 1,51 | 1.61 | 17.2 | 51.7 | 784 | Comparative Example |
| 22 | 2.2 | 14.2 | 0.3 | 53.8 | 1.52 | 1.55 | 21.7 | 50.8 | 584 | Comparative Example |

TABLE 3-continued

| Item No. | After skin pass Gs [–] | Texture after final annealing [411]<011> ratio [%] | Sheet thickness [mm] | Micro-structure Average grain size [μm] | Magnetic properties B50 (all-directional) [T] | B50 (45°) [T] | W10/400 (45°) [W/kg] | Iron loss deterioration percentage $W_x$ [%] | Mechanical properties. Tensile strength [MPa] | Evaluation |
|---|---|---|---|---|---|---|---|---|---|---|
| 23 | 2.1 | 13.6 | 0.3 | 12.1 | 1.52 | 1.62 | 16.8 | 51.3 | 780 | Comparative Example |
| 24* | 2.8 | 6.8 | 0.3 | 33.4 | 1.50 | 1.46 | 16.9 | 48.2 | 646 | Comparative Example |

Underlines indicate outside of the ranges of the present invention, and manufacturing conditions that are not preferable.

*Hot-rolled sheet annealing for holding the hot-rolled sheet at 1,000° C. for 1 minute was performed.

Underlines in Tables 1, 2, and 3 indicate conditions that deviated from the ranges of the present invention, manufacturing conditions that were not preferable, and property values that were not preferable. Present Invention Example Nos. 1, 4, 7, 8, and 14 to 17, which are present invention examples, had good values for all of the magnetic flux density B50, the iron loss W10/400, the iron loss deterioration percentage, and the tensile strength.

On the other hand, in Comparative Example No. 2, since the rapid cooling was performed after the finish rolling, the {411}<011> ratio became small and the iron loss deterioration percentage under a compressive stress was large. In addition, since the Ti was not contained, the average grain size became too large, and the tensile strength was insufficient.

In Comparative Example No. 3, since the total amount of one or more selected from the group consisting of Mn, Ni, and Cu was insufficient and a composition that did not cause α-γ transformation was provided, the {411}<011> ratio was small, and the magnetic flux density B50 (45° direction), the iron loss W10/400, and the iron loss deterioration percentage were inferior. Since No. 3 had the composition that did not cause α-γ transformation, the Ar1, Ac1, and Ac3 points were not described.

In Comparative Example No. 5, since the finish rolling temperature FT was lower than the Ar1 point, the {411}<011> ratio was small, and the Ti was contained excessively, the magnetic flux density B50 (45° direction), the iron loss W10/400, and the iron loss deterioration percentage were inferior.

In Comparative Example No. 6, since the time after the final pass of the finish rolling until the cooling was started was too short, the {411}<011> ratio was small, and the iron loss deterioration percentage under compressive stress was large.

In Comparative Example No. 9, since Si was insufficient, W10/400 was large. In addition, since Ti was not contained, the average crystal grain size became too large and the tensile strength was insufficient.

In Comparative Example No. 10, since the total amount of one or more selected from the group consisting of Mn, Ni, and Cu was excessive, the magnetic flux density B50 was inferior in both the 45° direction and the all-directional average. In addition, partial double cracking had occurred due to segregation during the cold rolling.

In Comparative Example No. 11, since the skin pass rolling was not performed, the {411}<011> ratio was small, and the magnetic flux density B50 (450 direction), the iron loss W10/400, and the iron loss deterioration percentage were inferior.

In Comparative Example No. 12, since the rolling reduction RR2 in the skin pass rolling was too large, the {411}<011> ratio was small, and the magnetic flux density B50 (45° direction) and the iron loss W10/400 were inferior.

In addition, Comparative Example Nos. 13, and 18 to 24 deviated from preferable manufacturing conditions and could not obtain a desired metallographic structure and desired properties.

INDUSTRIAL APPLICABILITY

According to the above aspect according to the present invention, it is possible to provide a non-oriented electrical steel sheet having a low iron loss, a high magnetic flux density, and a high strength.

What is claimed is:

1. A non-oriented electrical steel sheet comprising, as a chemical composition, by mass %:
- C: 0.0100% or less;
- Si: 1.5% to 4.0%;
- sol. Al: 0.0001% to 1.000%;
- S: 0.0100% or less;
- N: 0.0100% or less;
- Ti: 0.0005% to 0.0050%;
- one or more selected from the group consisting of Mn, Ni, and Cu: 2.5% to 5.0% in total;
- Co: 0.0% to 1.0%;
- Sn: 0.00% to 0.40%;
- Sb: 0.00% to 0.40%;
- P: 0.000% to 0.400%;
- one or more selected from the group consisting of Mg, Ca, Sr, Ba, Ce, La, Nd, Pr, Zn, and Cd: 0.000% to 0.010% in total, in which Expression (1) is satisfied in a case where a Mn content (mass %) is indicated as [Mn], a Ni content (mass %) is indicated as [Ni], a Cu content (mass %) is indicated as [Cu], a Si content (mass %) is indicated as [Si], a sol. Al content (mass %) is indicated as [sol. Al], and a P content (mass %) is indicated as [P]; and
- a remainder consisting of Fe and impurities,
- wherein, in a case where an area ratio of grains having a crystal orientation of an {hkl}<uvw> orientation (within a tolerance of 10°) when measured by EBSD is denoted as Ahkl-uvw, A411-011 is 15.0% or more, and
- the non-oriented electrical steel sheet has an average grain size of 10.0 μm to 40.0 μm, $$(2\times[Mn]+2.5\times[Ni]+[Cu])-([Si]+2\times[sol.\ Al]+4\times[P])\geq 1.50\% \quad (1).$$

2. The non-oriented electrical steel sheet according to claim 1, wherein a magnetic flux density B50 in a 450 direction with respect to a rolling direction is 1.70 T or more, and an iron loss W10/400 in the 45° direction with respect to the rolling direction is 14.0 W/kg or less.

* * * * *